United States Patent [19]

Berntsen et al.

[11] 4,087,945

[45] May 9, 1978

[54] DRIVEN-TYPE SURVEY MONUMENT

[76] Inventors: Peter Berntsen; Phillip R. Peterson, both of P.O. Box 3025, Madison, Wis. 53704

[21] Appl. No.: 771,559

[22] Filed: Feb. 24, 1977

[51] Int. Cl.² .................................................. E01F 9/02
[52] U.S. Cl. ........................................... 52/103; 52/157
[58] Field of Search .................. 52/157, 103, 165, 726, 52/153, 155; 174/7; 175/19, 414, 415; 61/53, 68; 85/30, 20, 1 P

[56] References Cited

U.S. PATENT DOCUMENTS

| 791,442 | 6/1905 | Anderton | 85/20 |
|---|---|---|---|
| 1,177,180 | 3/1916 | Garton | 174/7 |
| 3,378,967 | 4/1968 | Baumeister | 52/103 X |
| 3,688,014 | 8/1972 | Versteeg | 174/7 |
| 3,716,649 | 2/1973 | Smith et al. | 174/7 |
| 3,722,604 | 3/1973 | Lesher | 175/19 |
| 3,899,856 | 8/1975 | Johnson | 52/103 X |
| 3,916,821 | 11/1975 | Pies | 52/103 X |

FOREIGN PATENT DOCUMENTS 1,214,297   12/1970   United Kingdom ...................... 174/7

Primary Examiner—Ernest R. Purser
Assistant Examiner—Carl D. Friedman
Attorney, Agent, or Firm—Harry C. Engstrom; Theodore J. Long; Nicholas J. Seay

[57] ABSTRACT

A survey monument having cylindrical rod sections which are assembled in end-to-end relation with threaded connectors as the monument is driven into the ground. The monument has a penetrating point which has generally longitudinal barbs spaced about the periphery of the point. Each of the barbs has a turning surface biased about 5° for rotating the point in a direction to tighten the threaded connections of the monument in response to downward driving of the point into the ground. Each of the barbs has an upwardly facing retention shoulder to prevent removal. A marker cap is tap fit over the top of the uppermost rod section. The parts are metallurgically matched for ultimate natural fusion and to prevent galvanic action or electrolysis after the monument is emplaced in the ground.

5 Claims, 4 Drawing Figures

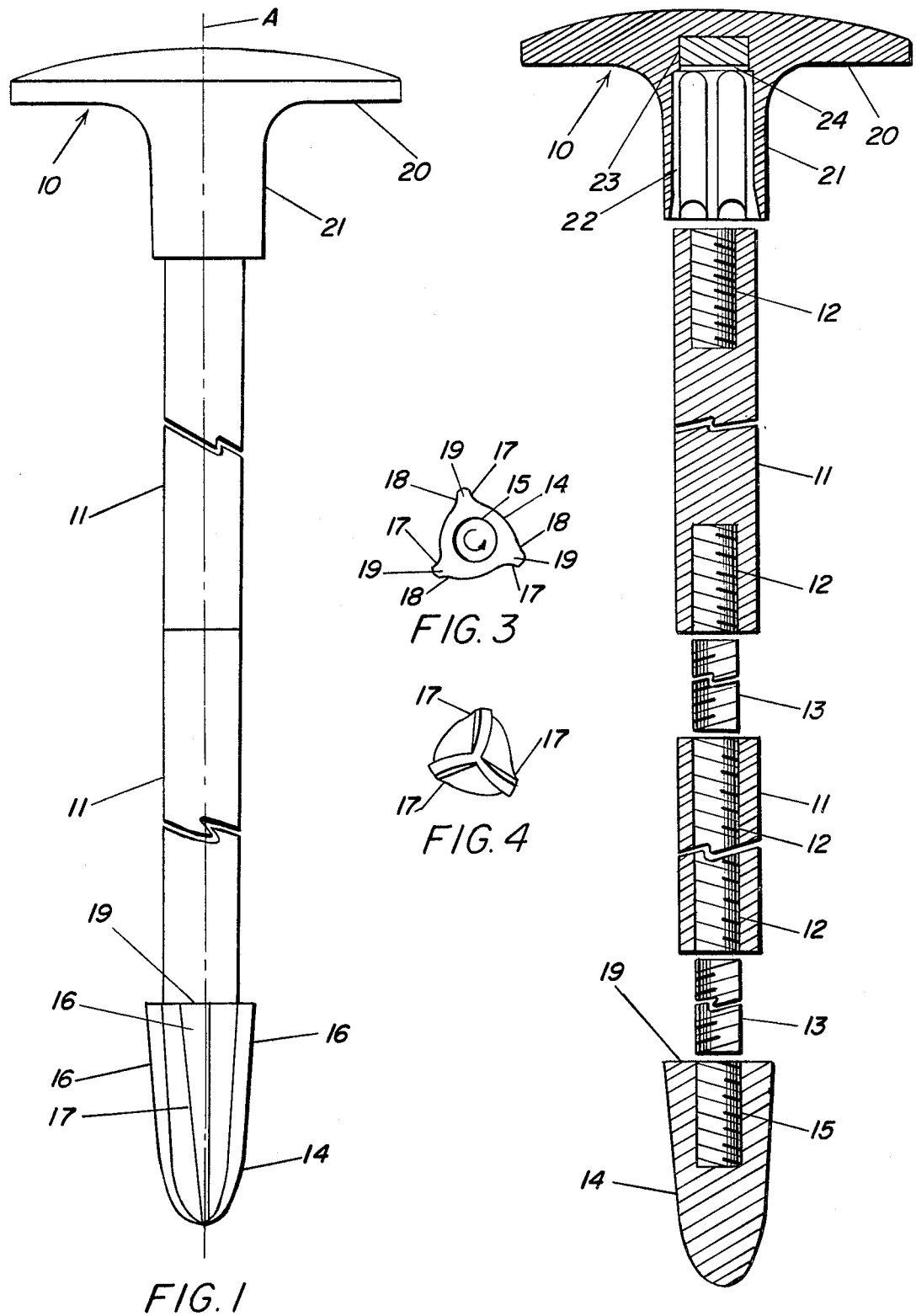

DRIVEN-TYPE SURVEY MONUMENT

BACKGROUND OF THE INVENTION

This invention relates to survey monuments and more particularly to a sectionalized, driven-type monument.

The survey monument is assembled as it is emplaced and is designed to meet the needs of those who desire to monument deep underground or to the point of refusal. While sectionalized driven-type monuments are known, none combines the unique features of our monument.

SUMMARY OF THE INVENTION

This invention comprises a unique driven-type survey monument with a combination of improved features. The monument basically comprises a series of upright cylindrical rod sections, which sections are assembled in end-to-end relation with threaded connectors as the monument is driven into the ground. A unique penetrating point is attached to the lowermost rod section by a threaded connector. The point has a plurality of generally longitudinal barbs spaced about the periphery of the point. Each of the barbs has a turning surface biased about 5° from the center line of the point for rotating the point in a direction to tighten the threaded connections of the monument in response to downward driving of the point into the ground. The barbs also have upwardly facing retention shoulders protruding radially outward beyond the lower end of the lowermost rod section to prevent removal of the monument once it is emplaced. The monument has a marker cap with a longitudinally fluted socket portion for a tight fit on the top rod section.

The parts of the monument are metallurgically matched to achieve ultimate natural fusion and to prevent galvanic action or electrolysis after the monument has been emplaced in the ground.

Further objects, features and advantages of our survey monument invention will be apparent from the following detailed description taken into conjunction with the accompanying drawings showing a preferred embodiment of the invention for exemplification.

BRIEF DESCRIPTION OF THE DRAWINGS

FIG. 1 is an elevation view of a survey monument embodying the principles of our invention.

FIG. 2 is an exploded view of the survey monument shown in FIG. 1, with some of the parts shown in section.

FIG. 3 is a top view of the penetrating point of the survey monument.

FIG. 4 is a bottom view of the penetrating point of the survey monument.

DESCRIPTION OF THE PREFERRED EMBODIMENT

Referring now more particularly to the drawings wherein like numerals refer to like parts throughout the several views, the survey monument is generally referred to by numeral 10 in FIGS. 1 and 2.

As shown in FIGS. 1 and 2, our survey monument comprises a series of cylindrical rod sections 11, only two of which are shown for exemplification. The rod sections shown are identical and have threaded bores 12 formed in both their upper and lower ends. The rod sections 11 are coupled together by threaded connectors such as shown at 13 which are turned into the threaded bores of the adjacent ends of the rod sections. The connectors are precision machined floating studs that tightly join the ends of the rod sections together in end-to-end mated alignment. A tapered penetrating point 14, shown in FIGS. 1-4, has a threaded bore 15 formed in the top end thereof and is attached to the lower end of the lowermost rod section by one of the threaded connectors 13. The threaded connectors 13 and bores 12 and 15 are all threaded in the same direction, right-hand threads being shown for exemplification.

The penetrating point 14 has a plurality, (three shown) of generally longitudinal elongated barbs 16 radially spaced equally on the periphery of the penetrating point. The barbs each have a biased turning surface 17 for rotating the point about its central axis A in a direction so as to tighten the threaded connections of the monument in response to downward driving of the point into the ground. As best shown in FIG. 1, each of the turning surfaces 17 is biased at an angle of about 5° from the central axis A of the penetrating point. As best shown in FIG. 3, lead surfaces 18 opposite the turning surfaces 17, blend into the curvation of the peripheral surface of the point more gradually than the turning surfaces to facilitate rotation of the point in the direction of the arrow in FIG. 3.

Each of the barbs has an upwardly facing retention shoulder 19 which protrudes radially outward beyond the lower end of the lowermost rod section to which the penetrating point is connected to prevent removal of the monument once it is emplaced in the ground.

As shown in FIGS. 1 and 2, a marker cap 20 having a socket portion 21 which has a slightly tapered, longitudinally fluted inside surface 22 adapted to be fit over the upper end of the uppermost rod section. The slightly tapered and fluted surface provides an easy fitting yet tight connection when the cap is tapped onto the rod section. A recess 23 in the top of the socket 21 has a permanent magnet 24 mounted therein.

A case hardened steel driving head (not shown) may be provided for driving this type of monument into place. To make an emplacement, a penetrating point is first attached to a rod section with a threaded connector. The monument is driven into the ground, a section at a time, coupling as many additional rod sections on top as needed depending on the depth of the installation. As the penetrating point is driven downwardly into the ground, the biased turning surfaces of the barbs cause the point to rotate in a direction to tighten all of the threaded connections of the monument to assure that all connections remain locked. The turning surfaces which are biased at about 5°, impart approximately one revolution per 30 inches of driven depth.

Once the monument is emplaced, the upwardly facing retention shoulders which protrude outwardly beyond the lower end of the rod section to which the penetrating point is connected, provide resistance to withdrawal and effectively prevent removal of the monument.

When the monument has been driven to the desired depth or the point of refusal, the driving head (not shown) is removed and the cap portion is tapped onto the top end of the last rod section. If the point of refusal is met while the top rod section protrudes well above the ground, the protruding portion of the top rod section can easily be cut off and the cap then tapped onto the remaining portion of the top rod section.

The rod sections, penetrating point and marker cap are metallurgically matched so that over a period of time they fuse together naturally after the monument has been emplaced in the ground. The rod sections, point and marker cap are comprised of an aluminum-magnesium alloy whereas the threaded floating connectors are made of a high chromium-nickel alloy to provide maximum strength without creating potential galvanic action or electrolysis between the connectors and the aluminum-magnesium alloy parts.

It is understood that our invention is not confined to the particular construction, arrangement of parts or materials herein illustrated and described, but embraces all such modified forms thereof as come within the scope of the following claims.

We claim:

1. A driven-type survey monument comprising: a series of upright cylindrical rod sections having a longitudinal threaded bore in their upper and lower ends, threaded connectors turned into the threaded bores and capable of connecting the rods of said series in end-to-end tightly mated aligned relation, said rods being connected solely by said threaded connectors such that said series of rods is of uniform cross-section throughout the length of said series, a penetrating point attached at the lower end of the lowermost rod section by a threaded connector, and at least two generally longitudinal barbs radially spaced on the periphery of said penetrating point, said barbs having a biased turning surface for rotating said point and said series of rods connected thereto in a direction to tighten the threaded connections between said penetrating point and said lowermost rod and between all of said rods of the monument in response to downward driving of the point into the ground.

2. The driven-type survey monument as specified in claim 1 wherein said barbs have an upwardly facing retention shoulder protruding radially outward beyond the lower end of the lowermost rod section to which the penetrating point is connected.

3. The driven-type survey monument as specified in claim 1 comprising a marker cap having a longitudinally fluted socket portion adapted to fit over the upper end of the uppermost rod section.

4. The driven-type survey monument as specified in claim 3 wherein said rod sections, penetrating point and marker cap are all comprised of aluminum-magnesium alloy for natural ultimate fusion of these parts when the monument is emplaced in the ground.

5. The driven-type survey monument as specified in claim 4 wherein said connectors are comprised of a chromium-nickel alloy to prevent galvanic action and electrolysis between said connectors and said rod sections and penetrating point.

* * * * *